Feb. 25, 1958 E. G. GRAVENHORST ET AL 2,824,568
FLUID PRESSURE REGULATORS
Filed May 6, 1954 2 Sheets-Sheet 1

INVENTORS.
Everett G. Gravenhorst,
Stephen G. Evangelides.
By Clark+Ott
Attorneys.

Feb. 25, 1958 E. G. GRAVENHORST ET AL 2,824,568
FLUID PRESSURE REGULATORS
Filed May 6, 1954 2 Sheets-Sheet 2

INVENTORS.
Everett G. Gravenhorst,
Stephen G. Evangelides.
By Clark+Att
Attorneys.

United States Patent Office 2,824,568
Patented Feb. 25, 1958

2,824,568
FLUID PRESSURE REGULATORS

Everett G. Gravenhorst, Baltimore, Md., and Stephen G. Evangelides, New York, N. Y., assignors to Air Associates, Inc., Teterboro, N. J., a corporation of New Jersey Application May 6, 1954, Serial No. 427,957

3 Claims. (Cl. 137—116.3)

This invention relates to a fluid pressure regulator for regulating and varying the outlet pressure of either a gas or a liquid in accordance with requirements.

An object of the invention is to provide a pressure regulator which is controlled by the movement of a diaphragm having control pressure on one side thereof and atmospheric pressure on the opposite side.

Another object of the invention is to provide a pressure regulator having a relief valve which is normally closed and which is opened for venting the regulator when the outlet pressure reaches a predetermined maximum.

Another object of the invention is to provide a pressure regulator which is sensitive to vary the outlet pressure in accordance with any small increase or decrease in the control pressure.

Another object of the invention is to provide a pressure regulator for use in connection with operational parts of an aircraft for varying the outlet pressure from the regulator to the operational parts in accordance with requirements due to the speed of the aircraft.

With the foregoing and other objects in view, reference is now made to the following specification and accompanying drawings in which the preferred embodiment of the invention is illustrated.

Figure 1:
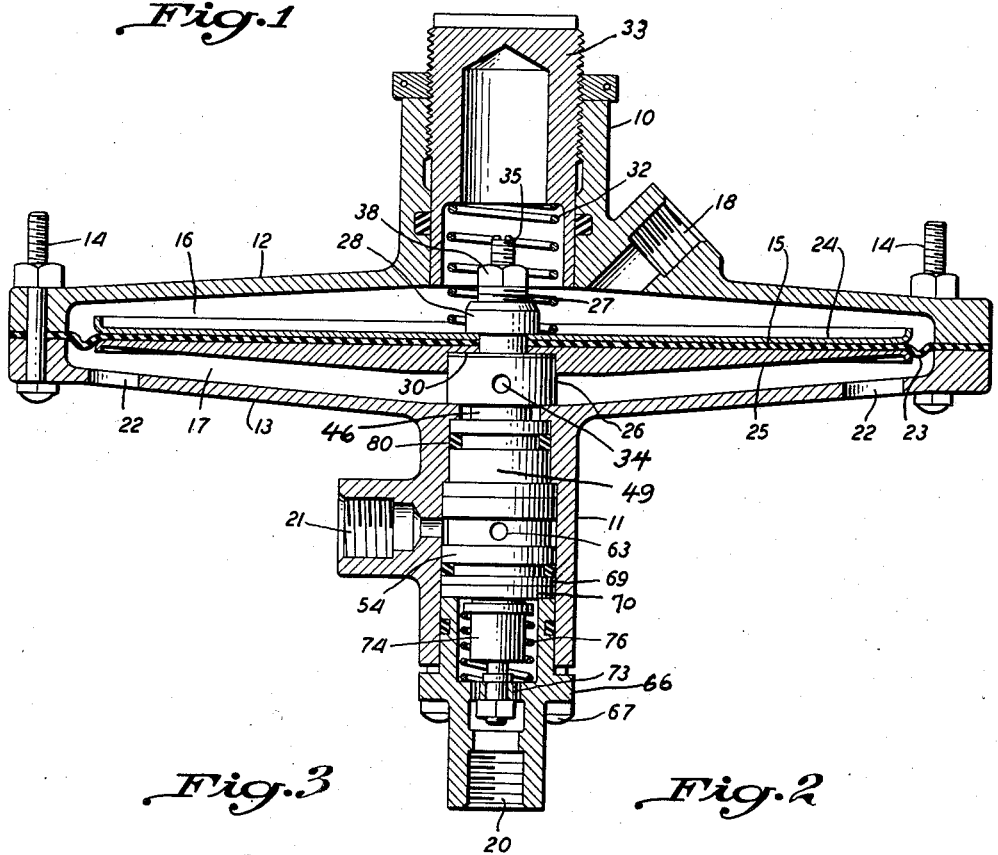
Fig. 1 is a vertical sectional view through a pressure regulator constructed in accordance with the invention.
Figure 3:
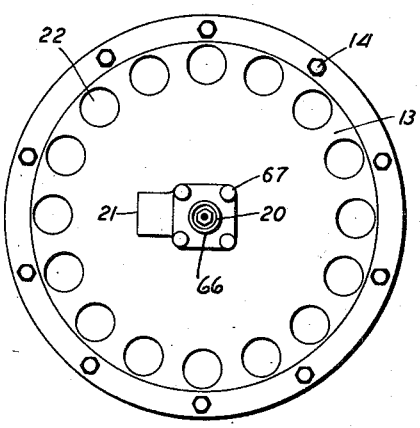
Fig. 3 is a similar view of the under side of the regulator.
Figure 2:
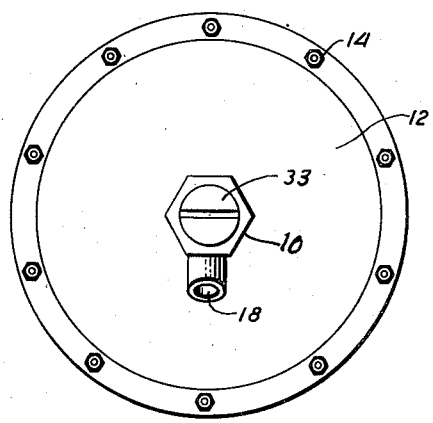
Fig. 2 is a reduced top plan view thereof.

Referring to the drawings, the fluid pressure regulator includes upper and lower hollow body portions 10 and 11 having flanged confronting ends 12 and 13 respectively which are secured together by bolts 14. A flexible diaphragm 15 is secured between said ends forming upper and lower diaphragm chambers 16 and 17. The upper body portion 10 is provided with a control pressure inlet 18 opening into the upper diaphragm chamber, while the lower body portion 11 is provided with a high pressure inlet 20 and a regulated or controlled pressure outlet 21 located intermediate the high pressure inlet 20 and the lower diaphragm chamber. The lower body portion 11 is also provided with a plurality of radially arranged openings 22 which vent the lower diaphragm chamber.

The diaphragm 15 is provided with a fullness 23 adjacent its periphery and inwardly therefrom it is clamped between upper and lower plates 24 and 25 which are centrally apertured and secured between the enlarged lower end 26 of a tubular member 27 and a collar 28 threadedly engaging the reduced upper end of the tubular member 27. The collar 28 is tightened against the upper plate 24 with the enlarged lower end 26 of the tubular member 27 tightened against the recessed under face 30 of the lower plate 25. The diaphragm is tensioned by a coil spring 32 which is interposed between the upper plate 24 and a cap 33 threadedly engaging in the upper end of the upper body portion 10. The tension of the spring 32 may be varied by adjusting the cap 33 in the upper body portion. The lower end 26 of the tubular member 27 is formed with vent apertures 34 and the same is adapted to seat on the inner face of the flange 13 of the lower body portion 11 so as to provide a stop to limit the downward movement of the diaphragm.

Mounted in the upper end of the tubular member 27 is a screw 35 having an enlarged lower portion 36 which is in bearing engagement with the rounded upper end of a poppet 37 for downward movement of the poppet with the diaphragm. The screw 35 may be adjusted vertically for varying the movement of the poppet and the screw is adapted to be secured in set position by the tightening of a lock nut 38 against the upper end of the tubular member 27.

The poppet 37 includes a flanged upper end 39 and a cylindrical lower portion 44 threadedly secured on the shank of the flanged upper end 39. The said cylindrical lower portion 44 is provided with radially arranged ducts 45 which open through the lower end thereof into the lower end of a load cylinder 46 and which have side outlets 47 at their upper ends below the flanged upper end 39 of the poppet. The cylindrical lower portion 44 of the poppet has reciprocatory sliding movement in the load cylinder 46 which seats at its upper end against a compressible disk 48 located in a recess in the under side of the flanged upper end 39 of the poppet whereby the load cylinder has downward movement with the poppet within a bushing 49 fitted within the lower portion 11 of the casing adjacent the upper end thereof. The load cylinder 46 is formed with a flange 50 at its lower end which is adapted to seat against a ring 51 which is fitted within the lower body portion 11 between the inner periphery thereof and the periphery of the load cylinder and in engagement with the lower end of the bushing 49. The flange 50 of the load cylinder is adapted to engage against the under side of the ring 51 which forms a stop to limit the upward movement of the load cylinder. A coil spring 52 is interposed between the flange 50 and the bottom wall of a bushing 54 located within the lower body portion 11. The spring 52 normally maintains the load cylinder 46 in seated engagement on the disk 48 to thereby seal off the interior of the load cylinder from the lower diaphragm chamber 17 and accordingly from the atmosphere since the said chamber is vented through the openings 22. The load cylinder 46 seating against the disk 48 in the flanged upper end of the poppet thus forms a relief valve for the regulator.

A plunger 55 is tightly fitted at its upper end in the lower end of the load cylinder 46. The said plunger is formed with a flange 56 which engages against the lower end of the load cylinder and below the said flange the plunger is provided with a reduced lower end 57 which is disposed in engagement with a poppet 58 arranged to control the flow of the fluid into the regulator from the high pressure inlet 20. The plunger 55 extends centrally through the bushing 54 and is formed with a plurality of radially arranged apertures 60 which open into the interior of the bushing and into a central bore 61, which bore opens through the upper end of the plunger and into a cavity 62 between the plunger and the lower end of the cylindrical lower portion 44 of the poppet.

The bushing 54 is provided with radially arranged openings 63 in the side wall thereof which open into the interior thereof and into a peripheral recess 64 which is in communication with the outlet 21. This construction permits of the flow of the fluid from within the valve upwardly through the plunger and through the ducts 45 in the cylindrical lower end 44 of the poppet 37 so as to exert an upward pressure against the flange of the poppet to move the poppet upwardly from seated engagement on the upper end of the load cylinder 46 to vent the regulator to the atmosphere in the event that the pressure in the outlet 21 reaches a predetermined maximum.

The poppet 58 is mounted for reciprocatory movement in a fitting 66 extending into the lower end of the lower body portion 10 of the regulator and secured thereto by screws 67. Arranged between the inner end of the fitting 66 and the lower end of the bushing 54 are apertured disks 69 and 70, the disk 69 providing a valve seat 71 for the conical upper end of the poppet 58. The poppet is mounted for guided reciprocatory movement on a guide stem 72 which is secured to a partition wall 73 in the fitting 66 to extend inwardly therefrom in axial alignment with the valve seat 71. The poppet 58 is nested in a cylindrical cup 74 which is movable with the poppet and provided with an opening in the lower end thereof disposed in alignment with the central bore 75 in the poppet for receiving the upper end of the guide stem 72 on which the same have guided sliding movement. A coil spring 76 is interposed between the flanged upper end of the cup and the partition wall 73 for tensioning the poppet against the seat 71. The inlet pressure within the fitting 66 against the cylindrical cup 74 and the poppet 58 substantially balances the same since the area of the lower end of the cup and the flange thereof is substantially the same as the area of the conical end of the poppet outwardly of the engagement thereof with the seat when the poppet is seated.

The poppet 58 is also provided with an opening 77 at its inner end which communicates with the bore 75 whereby the pressure within the bore at the upper end of the guide stem 72 may readily escape therefrom or be admitted thereto with the movement of the poppet and the pressure therein tends to balance the poppet. The poppet is therefore urged towards the seat 71 by the spring 76 only. The partition wall 73 is formed with a plurality of radially arranged openings 78 through which the high pressure fluid from the inlet 20 is admitted into the inner end of the fitting 66.

Figures 4, 5:
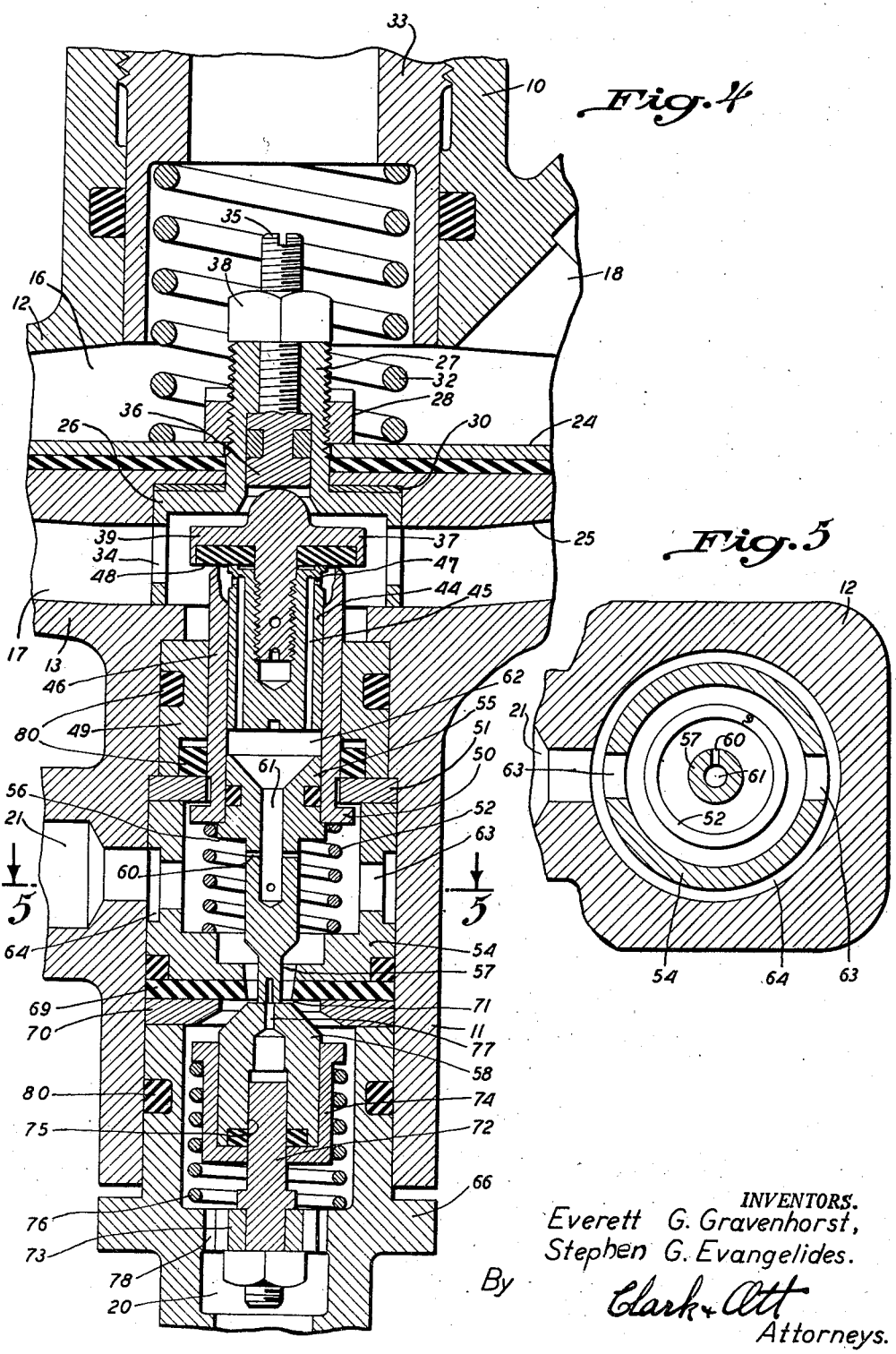
Fig. 4 is an enlarged fragmentary vertical sectional view through a central portion of the regulator.
Fig. 5 is a cross-sectional view taken approximately on line 5—5 of Fig. 4.

When the regulator is disconnected and is without pressure at the control pressure inlet 18, and at the high pressure inlet 20, and at the controlled pressure outlet 21, the spring 32 exerts a sufficient pressure against the load cylinder 46 and the poppet 58 and thereby against the springs 52 and 76 as to maintain the poppet in open relation as shown in Fig. 4 of the drawings. When, however, the regulator is connected into a control system and there is control fluid pressure in the diaphragm chamber 16 and high pressure fluid in the inlet 20, the high pressure fluid will be admitted through the valve opening and to the controlled outlet 21 until the requirement of the system is supplied. When this requirement has been met the pressure at the controlled outlet 21 and within the bushing 54 will move the load cylinder 46 against the pressure of the diaphragm whereupon the poppet 58 will be released and the spring 76 will then move the poppet to closed relation on its seat.

In connection with the use of the pressure regulator for controlling the pressure in a fluid system for movement of the operational parts of aircraft, the pressure inlet 18 would be connected with means such as a Pitot tube installed in the forward part of the aircraft and subject to the varying pressure against the aircraft when in flight. The pressure would be admitted to the upper diaphragm chamber 16 whereby the diaphragm would move in accordance therewith to regulate the opening and closing of the poppet 58. On an increase of pressure against the aircraft there should be a corresponding increase of pressure in the fluid system for the movement of the operational parts since the same would require increased pressure due to the increase of pressure against the aircraft. This increase of pressure in the Pitot tube would cause an increase of pressure in the upper diaphragm chamber 16 to thereby effect downward movement of the diaphragm and downward movement of the poppet 37, the load cylinder 46 together with the plunger 55 and the poppet 58 away from the valve seat 71 to thereby admit fluid pressure from the high pressure inlet 80 for discharge through the outlet 21 which outlet is connected with the fluid control system for effecting movement of the operational parts of the aircraft. Thus any slight increase or decrease in pressure against the aircraft will produce an immediate corresponding increase or decrease of pressure in the fluid control system.

In the event that the pressure in the control system reaches a predetermined limit the same will be exerted against the lower end of the cylindrical lower portion 44 of the poppet 37 to move the poppet upwardly against the tension of the spring 32 and the pressure in the upper diaphragm chamber 16. This upward movement of the poppet will elevate the same from the upper end of the load cylinder 46 whereby the excessive pressure in the outlet 21 will be vented through the ducts 60 and bore 61 in the plunger 55 and through the ducts 45 in the cylindrical lower portion 44 of the poppet and into the lower diaphragm chamber 17 which is open to the atmosphere.

In order to prevent leakage of the fluid between the lower body portion 11 and the bushings 49, 54 and the fitting 66, the same are provided with annular recesses in which rubber packing rings 80 such as O rings and the like are arranged.

While the preferred form of the invention has been illustrated and described herein, it is to be understood that the same is not so limited but shall cover and include any and all modifications thereof which fall within the purview of the invention.

It will be understood that to facilitate manufacture the poppet 37 is made up of the flanged upper end 39 and the cylindrical lower portion 44. These two parts are permanently affixed and function as one member. The load cylinder 46 and the plunger 55 also consist of two parts for ease of manufacture but the same are permanently affixed and function as one member.

What is claimed is:

1. In a fluid pressure regulator, a casing having a control pressure fluid inlet, a high pressure fluid inlet and a controlled pressure fluid outlet, a flexible diaphragm arranged within said casing providing diaphragm chambers arranged on opposite sides of said diaphragm, one of which is in communication with the control fluid inlet providing a control pressure chamber and the other of which is open to the atmosphere providing an atmospheric chamber, a valve opening arranged between said high pressure inlet and said controlled pressure outlet, a reciprocatory valve element tensioned to move the same to close said valve opening, two interengaged reciprocatory members disposed between said diaphragm and said valve element and having combined movement in one direction with the movement of the diaphragm for moving the valve element away from said valve opening to admit fluid from said high pressure inlet to said controlled outlet, said members having a flow passageway for venting the regulator to said atmospheric chamber, one of said members having a head biased against said diaphragm and located within said atmospheric chamber against which the other of said two members seats in surrounding relation with the outlet of said flow passageway for shutting off the flow of fluid from said flow passageway to said atmospheric chamber, and said two members having relative movement from seated relation when the pressure at the controlled outlet reaches a predetermined limit to dispose said member out of surrounding relation with the outlet of said flow passageway to thereby permit the venting of said regulator to said atmospheric chamber.

2. In a fluid pressure regulator, a casing having a control pressure fluid inlet, a high pressure fluid inlet and a controlled pressure fluid outlet, a flexible diaphragm arranged within said casing providing diaphragm chambers arranged on opposite sides of said diaphragm, one of which is in communication with the control fluid inlet providing a control pressure chamber and the other of which is open to the atmosphere providing an atmospheric chamber, a valve opening arranged between said high pressure inlet and said controlled pressure outlet, a reciprocatory valve element tensioned to move the same to close said valve opening, two interengaged reciprocatory members disposed between said diaphragm and said valve element and having combined movement in one direction with the movement of the diaphragm for moving the valve element away from said valve opening to admit fluid from said high pressure inlet to said controlled outlet, said members having a flow passageway for venting the regulator to said atmospheric chamber, one of said members being tubular at one end and the other of said two members slidably fitting said tubular end and having a head disposed in engagement with said diaphragm against which said tubular end seats in surrounding relation with the outlet of said flow passageway for shutting off the flow of fluid from said flow passageway to said atmospheric chamber, and said two members having relative movement to move the head from said tubular end when the pressure at the controlled outlet reaches a predetermined limit to permit the venting of said regulator to said atmospheric chamber.

3. In a fluid pressure regulator, a casing having a control pressure fluid inlet, a high pressure fluid inlet and a controlled pressure fluid outlet, a flexible diaphragm arranged within said casing providing diaphragm chambers arranged on opposite sides of said diaphragm, one of which is in communication with the control fluid inlet providing a control pressure chamber and the other of which is open to the atmosphere providing an atmospheric chamber, a valve opening arranged between said high pressure inlet and said controlled pressure outlet, a reciprocatory valve element tensioned to move the same to close said valve opening, two interengaged reciprocatory members disposed between said diaphragm and said valve element and having combined movement in one direction with the movement of the diaphragm for moving the valve element away from said valve opening to admit fluid from said high pressure inlet to said controlled outlet, one of said interengaged members having a shank at one end disposed in engagement with the valve element and having a tubular opposite end and a flow passage extending through the wall of said member and opening into the hollow interior of said tubular end, the other of said interengaged members having a shank slidably fitting the interior of said tubular end and having a flange disposed in engagement with said diaphragm, said shank of said last mentioned member having a flow passage from the inner end thereof and opening through the wall thereof adjacent said flange, and said interengaged members having relative movement to dispose the tubular end of said first mentioned member into seated engagement with said flange to close off the flow of fluid from said flow passage to said atmospheric chamber and being relatively movable from said seated engagement to uncover the outlet of said flow passage to thereby permit of the venting of said regulator to said atmospheric chamber when the pressure at the controlled outlet reaches a predetermined limit.

References Cited in the file of this patent
UNITED STATES PATENTS

| | | |
|---|---|---|
| 1,210,891 | Blanchard et al. | Jan. 2, 1917 |
| 1,737,428 | Mercur | Nov. 26, 1929 |
| 1,903,338 | Horne | Apr. 4, 1933 |
| 2,089,144 | Work | Aug. 3, 1937 |
| 2,248,354 | Jaworowski | July 8, 1941 |
| 2,663,121 | Ramsey | Dec. 22, 1953 |